United States Patent
Levi et al.

(10) Patent No.: US 6,898,555 B2
(45) Date of Patent: May 24, 2005

(54) METHOD FOR INDICATING THE INTEGRITY OF USE-INFORMATION OF A COMPUTER PROGRAM

(75) Inventors: Asaf Levi, Hod Hasharon (IL); Ron Darziv, Portland, OR (US); Yanki Margalit, Ramat-Gan (IL); Dany Margalit, Ramat-Gan (IL)

(73) Assignee: Aladdin Knowledge Systems Ltd., Tel Aviv (IL)

( * ) Notice: Subject to any disclaimer, the term of this patent is extended or adjusted under 35 U.S.C. 154(b) by 112 days.

(21) Appl. No.: 10/617,756

(22) Filed: Jul. 14, 2003

(65) Prior Publication Data

US 2005/0015218 A1 Jan. 20, 2005

(51) Int. Cl.[7] .............................................. G06F 19/00
(52) U.S. Cl. ......................................... 702/186; 714/1
(58) Field of Search .................. 702/186, 57, 182–185, 702/188; 713/165, 213; 705/35; 712/223; 714/1–3, 25, 47–48

(56) References Cited

U.S. PATENT DOCUMENTS

2004/0015426 A1 * 1/2004 Tadayon et al. .............. 705/35
2004/0030912 A1 * 2/2004 Merkle et al. ............... 713/200
2004/0236945 A1 * 11/2004 Risan et al. ................. 713/165

* cited by examiner

Primary Examiner—Marc S. Hoff
Assistant Examiner—Edward Raymond
(74) Attorney, Agent, or Firm—Mark M. Friedman

(57) ABSTRACT

A method for indicating the integrity of the use-information of a program, comprising: providing a mechanism based on the state of a marker file (being one or more files dedicated especially for this purpose) for generating upon request an asymmetric (i.e. can be read by a user but cannot be altered by him) and unique or pseudo-unique value; instructing the mechanism to generate a value; sealing the use-information with the generated value; and indicating the integrity of the sealed data by the correspondence of the stored value with the current value returned by the mechanism. In a preferred embodiment of the invention, the information is stored in a secure manner (e.g. encrypted, digitally signed, and so forth). The invention may be implemented in any licensing model in which the use-information is important, like a Try before you Buy model, renting a program, and so forth.

15 Claims, 1 Drawing Sheet

METHOD FOR INDICATING THE INTEGRITY OF USE-INFORMATION OF A COMPUTER PROGRAM

FIELD OF THE INVENTION

The present invention relates to a method for indicating the integrity of the use-information of a computer program. More particularly, the present invention relates to a method for indicating the integrity of the use-information of a computer program, in which no external facility to the computer is required.

BACKGROUND OF THE INVENTION

The term "use-information" refers herein to information about measured use of a program on a computer, e.g. the remaining time for using the program, the number of times the program has been executed, and so forth. Typically, the use-information of a program is stored in a file, the registry of the user's computer, a hardware dongle, network server, etc.

The use of a program is measured by tracing an "exhausting resource" associated with the use. For example, in a Try/Buy model a program can be restricted to a trial period (the resource is the time), or to a predefined number of times the program is allowed to be executed (the resource is a counter), the accumulated run-time of the program, etc.

In case where the use-information of a program is stored in a storage facility, such as a file, registry, database, etc., the hacker can keep a copy of stored information, and occasionally replace the existing one by this copy, thereby enabling the program to work beyond its predetermined restrictions. In order to overcome these problems, it is common to keep the use-information in a plurality of files/registry entries instead of a single one. However this is not effective since nowadays there are a variety of programming tools for monitoring the I/O (input/output), network and registry activity of a program, by which a hacker can detect these locations.

Using an external resource to the computer is a proper solution to overcome the problems described above. For example, the manufacturer of a program can use a Web server for storing the use-information of a program, but in this case each time the program is activated it should be connected to the Web for granting the permission to continue to operate, which of course, is not always practical.

Another well known solution is an external device to the computer, which provides a secure storage means for the use-information and also an external solution to the exhausting resource (e.g. a real-time clock, a counter, etc.). Such a solution can be implemented by a smartcard chip, a security dongle, and so forth. However, this solution is not convenient for both the vendor of the program and the user. Moreover, implementing the solution involves additional costs, which may be a meaningful factor to the profitability of a program in the case where the price of the program is low.

It is therefore an object of the present invention to provide a method for indicating the integrity of the use-information of a computer program.

It is a further object of the present invention to provide a method for indicating the integrity of the use-information of a computer program, in which no external facility to the computer is required.

Other objects and advantages of the invention will become apparent as the description proceeds.

SUMMARY OF THE INVENTION

A method for indicating the integrity of the use-information of a program, comprising: providing a mechanism based on the state of a marker file (being one or more files dedicated especially for this purpose) for generating upon request an asymmetric (i.e. can be read by a user but cannot be altered by him) and unique or pseudo-unique value; instructing the mechanism to generate a value; sealing the use-information with the generated value; and indicating the integrity of the sealed data by the correspondence of the stored value with the current value returned by the mechanism. In a preferred embodiment of the invention, the information is stored in a secure manner (e.g. encrypted, digitally signed, and so forth). The invention may be implemented in any licensing model in which the use-information is important, like a Try before you Buy model, renting a program, and so forth.

BRIEF DESCRIPTION OF THE DRAWINGS

The present invention may be better understood in conjunction with the following figure.

DETAILED DESCRIPTION OF PREFERRED EMBODIMENTS

Figure 1:
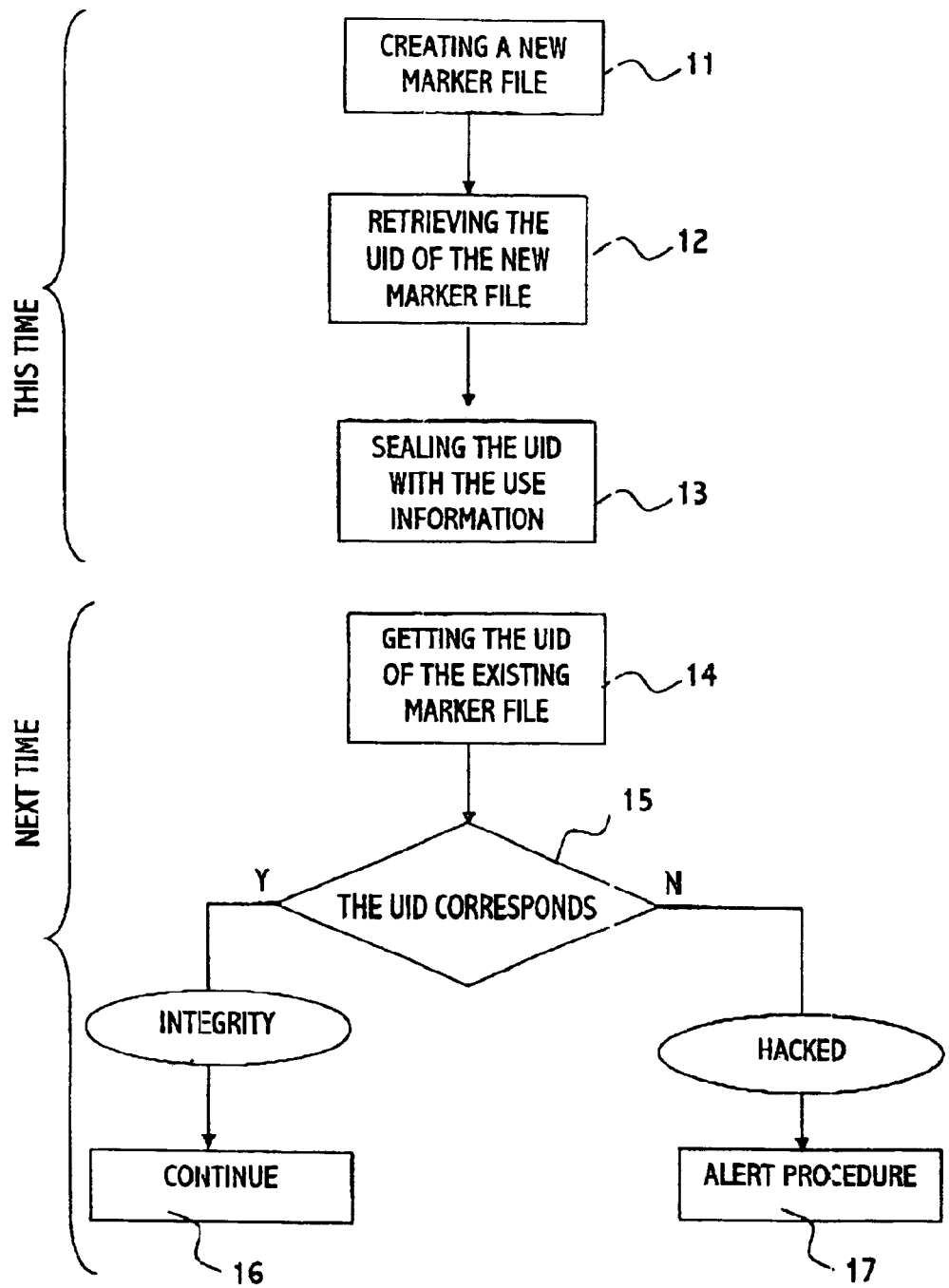
FIG. 1 is a flowchart of a method for indicating the integrity of use-information of a program, according to a preferred embodiment of the present invention.

In order to facilitate the reading of the text herein, the following terms are defined:

The term "program" refers herein to any form of computer executable, e.g. a software application, a library, and so forth.

The term "integrity" of content refers herein to content which has not been tampered with either at the file (manipulation of file contents) or file-system (manipulation of files or directories) levels.

The term "exhausting resource" or "resource" refers herein to a resource which is used in conjunction with measuring the use-information of a program.

The term "external" refers herein to a computing facility to be added to a computer to perform a function which the computer as is, is not able to perform. For example, a smartcard chip, "atomic" clock, etc.

As mentioned above, to be effective, licensing models such as Try/Buy and software rental require a proper solution to at least the problem of preventing the fraud of the use-information. Moreover, solving this problem by a non-external resource is preferable, since it involves less inconvenience to both the user and the vendor of the program.

In order to solve this problem, the present invention makes use of a mechanism which performs the followings:

(a) Derives upon request a value which sustains at least the following features:
   The value is unique or at least "pseudo-unique" (i.e. even if a value is repeated, it still will not be easy for a hacker to follow)(note that the term pseudo- include unique as a special case);
   The value is "asymmetric" (i.e. as per the user, the value is read only. Typically only the operating system can alter this value.)
(b) Returns upon request the last derived value.

This mechanism is referred herein as Unique Value Generator (UVG), and a generated value is referred herein as unique value.

Typically, each time the use-information is changed, the UVG mechanism is instructed to generate a new unique value. Then, the generated unique value is "sealed" with the use-information in order to indicate changes in the use-information. Consequently the integrity of the use-information is examined by the correspondence of the stored unique value with the current unique value of the UVG. Typically, before storing the use-information with the unique value, the integrity of the use-information is examined, and in case the integrity is indicated, the program is allowed to operate in accordance with its license (e.g. the trial period has not expired), otherwise the program may stop, warn the user, etc.

Sealing the unique value with the use-information can be carried out by adding a digital signature to the data chunk (i.e. the stored unique value with the use-information), encrypting the data chunk, keeping the data chunk out of the reach of a hacker (e.g. in an external device to the computer, such as smartcard), and so forth.

For example, let's consider the case where the use-information and the current unique value of the UVG are stored in a file, and the file is digitally signed. Each time the program (which is limited to predefined number of executions) is executed, the UVG mechanism is instructed to generate a new unique value, which is kept in the file with the use-information. The file is digitally signed, and therefore modifying the information by a hacker can be indicated. Accordingly the hacker may keep a copy of the marker file, in order to replace the existing file with the stored one later on, thereby bypass the digital signature obstacle. But since the unique value stored in the hacker's copy will not correspond to the current unique value returned by the UVG mechanism, the tampering will be indicated.

Implementing the Invention with a File ID:

According to a preferred embodiment of the invention, the UVG is based on the file ID mechanism, whenever it is available, e.g. in the Windows NT, Windows 2000 operating systems. According to this embodiment, the file ID (referred herein as FID) is a unique value that distinguishes one file from another, in a file system. Whenever a file is created, a unique FID is assigned to the file.

According to this embodiment of the invention, the FID of a certain file that is used for this purpose is used. This file is referred herein as "marker file". As mentioned above, the UVG generates a new unique value upon request, and this value is returned until the next time the UVG is instructed to generate a new value. This can be implemented by erasing the existing marker file and creating a new marker file instead of the erased one, thereby generating a new unique value.

Typical operations with a marker file are: opening and verifying the FID as described above, creating a new marker file thereby generating a new ID for a UVG mechanism, storing the FID along with the use-information in a marker file, deleting the old marker file thereby making the current unique value as irrelevant, renaming a marker file, and so forth.

Implementing the Invention Without a File ID:

The following mechanism can be used additionally or alternatively, especially under file systems that do not support the file ID feature.

Since one file is located in a different physical location than the other files in a file system, the information of the physical location of a marker file can be used as a substitute to the FID, in this regard. Thus upon creating a new file, the first allocated sector (cluster etc.) of the created file can be used as a unique value, in regard to the UVG.

Actually, the first sector of the marker file is only an example, and any information with relevance to the physical location of the marker file can be used instead, including any sector (or cluster) number of the marker file, a function of this value (i.e. sector/cluster), and so forth.

It should be noted that erasing the marker file and creating a new marker file with the same name also results in a unique value that differs from the unique value of the erased file.

The Defrag Problem

Defrag is a utility provided by the majority of the file systems, which arranges the files in a non-fragmented order. By storing the files in a non-fragmented mode, a faster file access is gained, and also the amortization of the disk becomes slower. However, since during the defrag operation the marker file may be shifted out from its original physical location, implementing the method disclosed herein may result with wrong indication about the fraud of use-information.

In some operating systems, e.g. the Windows Millennium, this can be solved by setting the hidden-flag of a marker file. Since Windows Millennium does not shift out hidden files during the defrag operation, it solves this problem. Of course the type of the attribute depends on the operating system, since other operating systems may shift out hidden files, but not system files, for example.

Regarding the way a marker file is handled in order to change its physical location or ID, those skilled in the art will appreciate that instead of erasing the marker file and creating a new marker file instead, the following procedure can also be used:

(a) Creating a new marker file (e.g. NEW.DAT), thereby generating a new unique value;
(b) Deleting the existing marker file (e.g. CURRENT.DAT), thereby making the old value irrelevant;
(c) Renaming the new marker file (i.e. NEW.DAT) as the erased marker file (i.e. CURRENT.DAT), thereby a new generated value becomes the current unique value of the UVG.

FIG. 1 is a flowchart of a method for indicating the integrity of use-information of a program, according to a preferred embodiment of the present invention.

At 11, a new marker file is created. The created marker file has a unique identity. If the file system on which the created marker file is created supports the file ID feature, the unique identity may be the file ID of the marker file. Additionally or in the case where the file system does not support this feature, the unique identity may be a parameter with relevance to the physical location of the marker file, e.g. the number of its first sector, the number of its last sector, a hash function of its first sector, etc. In the case where a file location may be changed after its creation (e.g. due to the defrag utility), it is usually possible to set the system flag of the file, thereby preventing the file from being moved from its original physical location.

The term UID in FIG. 1 refers to the unique identification number of the marker file in the file system, whether it is the FID or a parameter derived from the state of the marker file. It should be noted that more than one marker file may be used for this purpose, e.g. the UID is composed from the multiplication of the FID of a first marker file with the FID of a second marker file.

At 12, the UID of the created marker file is retrieved. Alternatively or additionally, instead of the file UID, the unique identity is a parameter with relevance to the physical location, e.g. the first sector of the marker file.

At 13, the UID and the use-information are kept either in a secure manner (e.g. encrypted, digitally signed, etc.) or in a non-secure manner.

At 14, which is performed at the next time the program is executed, use-information and the unique UID of the marker file is retrieved.

At 15, if the retrieved UID corresponds to the current UID of the marker file then the integrity of use-information sustains, and the program is allowed to continue 16, subject to the license (e.g. the trial period); otherwise the "hacking" of the use-information is indicated, and accordingly an alert procedure is carried out 17, e.g. aborting the program, warning the user, etc.

In some operating systems erasing a file doesn't necessary mean losing its content, but merely turning on its delete-flag. In this case the hacker can "revive" a deleted marker file by changing its delete-flag. Those skilled in the art will appreciate that preventing the use of the information stored within a marker file can be carried out by changing its content before its removal (for example, setting all its bytes to "0"), adding the sectors of the erased marker file to the end of another file, and so forth.

Of course, this method can be implemented with external resource. For example, if the external resource is a counter, each time the program is executed the counter is increased by one. Next time, if the current value of the counter corresponds to the value of the counter which is stored with the use-information, it indicates the integrity of the use-information. The counter may be a part of a smartcard, a security token, a file on a remote server, and so forth.

It should be noted that the compared unique identification numbers do not necessarily have to be equal, but to correspond. For example, in case where the stored identification number is not necessarily the number of the first sector of the marker, but the number of a sector of the marker file, selected randomly.

It also should be noted that an interaction (i.e. testing the integrity, and sealing) doesn't necessarily have to be carried out when the program starts to run, but also during the program execution, at the end of the run, periodically (e.g. every 5 minutes) when the program runs, etc. Moreover, this can be carried out by a separate programming facility from the protected program.

It also should be noted that the use-information of a program can be stored also in its marker file.

Those skilled in the art will appreciate that the invention can be embodied by other forms and ways, without losing the scope of the invention. The embodiments described herein should be considered as illustrative and not restrictive.

What is claimed is:

1. A method for indicating integrity of use-information of a program on a computer, comprising:
   (a) providing a mechanism based on a state of a marker file accessible by the computer, for generating upon request an asymmetric, pseudo-unique value, said mechanism returning upon request said value that was most recently generated by said mechanism;
   (b) instructing said mechanism to generate a said value;
   (c) sealing the use-information with said generated value; and
   (d) indicating the integrity of the use-information by a correspondence of said sealed value with a current value returned by said mechanism;
   wherein said use-information is associated with an exhausting resource.

2. A method according to claim 1, wherein said generated value is derived at least from a file ID of said marker file.

3. A method according to claim 1, wherein said generated value is derived at least from a physical location of said marker file.

4. A method according to claim 3, wherein said physical location of said marker file is derived from a number of a sector of said marker file.

5. A method according to claim 3, wherein said physical location of said marker file is derived from a number of a cluster of said marker file.

6. A method according to claim 1, wherein said sealing is carried out by an operation selected from the group comprising: storing said use-information with said current value returned by said mechanism in an encrypted form, digitally signing said use-information with said current value returned by said mechanism, and storing out of the reach of a hacker said use-information with said current value returned by said mechanism.

7. A method according to claim 1, wherein said exhausting resource is based on at least one member selected from the group comprising: how many times the program is executed, an execution time of the program, a predefined period the program is allowed to run, and a trial period.

8. A method according to claim 1, wherein said sealing of said use-information with the generated value is carried out at a stage selected from the group comprising: a start of an execution of the program, a termination of said execution of the program, during said execution of the program, while the program is idle, and periodically.

9. A method according to claim 1, wherein said indicating the integrity of the use-information is carried out at a stage selected from the group comprising: a start of an execution of the program, a termination of said execution of the program, during said execution of the program, while the program is idle, and periodically.

10. A method according to claim 1, wherein said sealed information is stored in a member of the group comprising: at least one file, at least one marker file, and at least one registry entry.

11. A method for indicating integrity of use-information of a program on a computer, comprising:
    (a) providing a mechanism based on a state of a marker file accessible by the computer, for generating upon request an asymmetric, pseudo-unique value, said mechanism returning upon request said value that was most recently generated by said mechanism;
    (b) instructing said mechanism to generate a said value;
    (c) sealing the use-information with said generated value; and
    (d) indicating the integrity of the use-information by a correspondence of said sealed value with a current value returned by said mechanism;
    wherein an existing said marker file has a name, and wherein said generating a new value by said mechanism is carried out by steps including:
    creating a new marker file with a different name from said existing marker file;
    removing said existing marker file;
    changing said name of said new marker file to said name of said removed marker file; and
    retrieving an ID number of said new marker file.

12. A method for indicating integrity of use-information of a program on a computer, comprising:
    (a) providing a mechanism based on a state of a marker file accessible by the computer, for generating upon request an asymmetric, pseudo-unique value, said mechanism returning upon request said value that was most recently generated by said mechanism;

(b) instructing said mechanism to generate a said value;

(c) sealing the use-information with said generated value; and (d) indicating the integrity of the use-information by a correspondence of said sealed value with a current value returned by said mechanism;

wherein an existing said marker file has a name, and wherein said generating a new value by said mechanism is carried out by steps including:
   creating a new marker file with a different name from said existing marker file;
   removing said existing marker file;
   changing said name of said new marker file to said name of said removed marker file; and
   retrieving a parameter with relevance to a physical location of said new marker file.

13. A method for indicating integrity of use-information of a program on a computer, comprising:

(a) providing a mechanism based on a state of a marker file accessible by the computer, for generating upon request an asymmetric, pseudo-unique value, said mechanism returning upon request said value that was most recently generated by said mechanism;

(b) instructing said mechanism to generate a said value;

(c) sealing the use-information with said generated value; and (d) indicating the integrity of the use-information by a correspondence of said sealed value with a current value returned by said mechanism;

wherein said generating of a value by said mechanism is carried out by the steps of:
   removing an existing marker file; and
   creating a new marker file; and
   retrieving an ID number of said new marker file.

14. A method for indicating integrity of use-information of a program on a computer, comprising:

(a) providing a mechanism based on a state of a marker file accessible by the computer, for generating upon request an asymmetric, pseudo-unique value, said mechanism returning upon request said value that was most recently generated by said mechanism;

(b) instructing said mechanism to generate a said value;

(c) sealing the use-information with said generated value; and (d) indicating the integrity of the use-information by a correspondence of said sealed value with a current value returned by said mechanism;

wherein said generating of a value by said mechanism is carried out by the steps of:
   removing an existing marker file; and
   creating a new marker file; and
   retrieving a parameter with relevance to a physical location of said new marker file.

15. A method for indicating integrity of use-information of a program on a computer, comprising:

(a) providing a mechanism based on a state of a marker file accessible by the computer, for generating upon request an asymmetric, pseudo-unique value, said mechanism returning upon request said value that was most recently generated by said mechanism;

(b) instructing said mechanism to generate a said value;

(c) sealing the use-information with said generated value; and (d) indicating the integrity of the use-information by a correspondence of said sealed value with a current value returned by said mechanism;

wherein said use-information is used in a license model in which usage information of the program is involved.

* * * * *